United States Patent Office 2,898,155
Patented Aug. 4, 1959

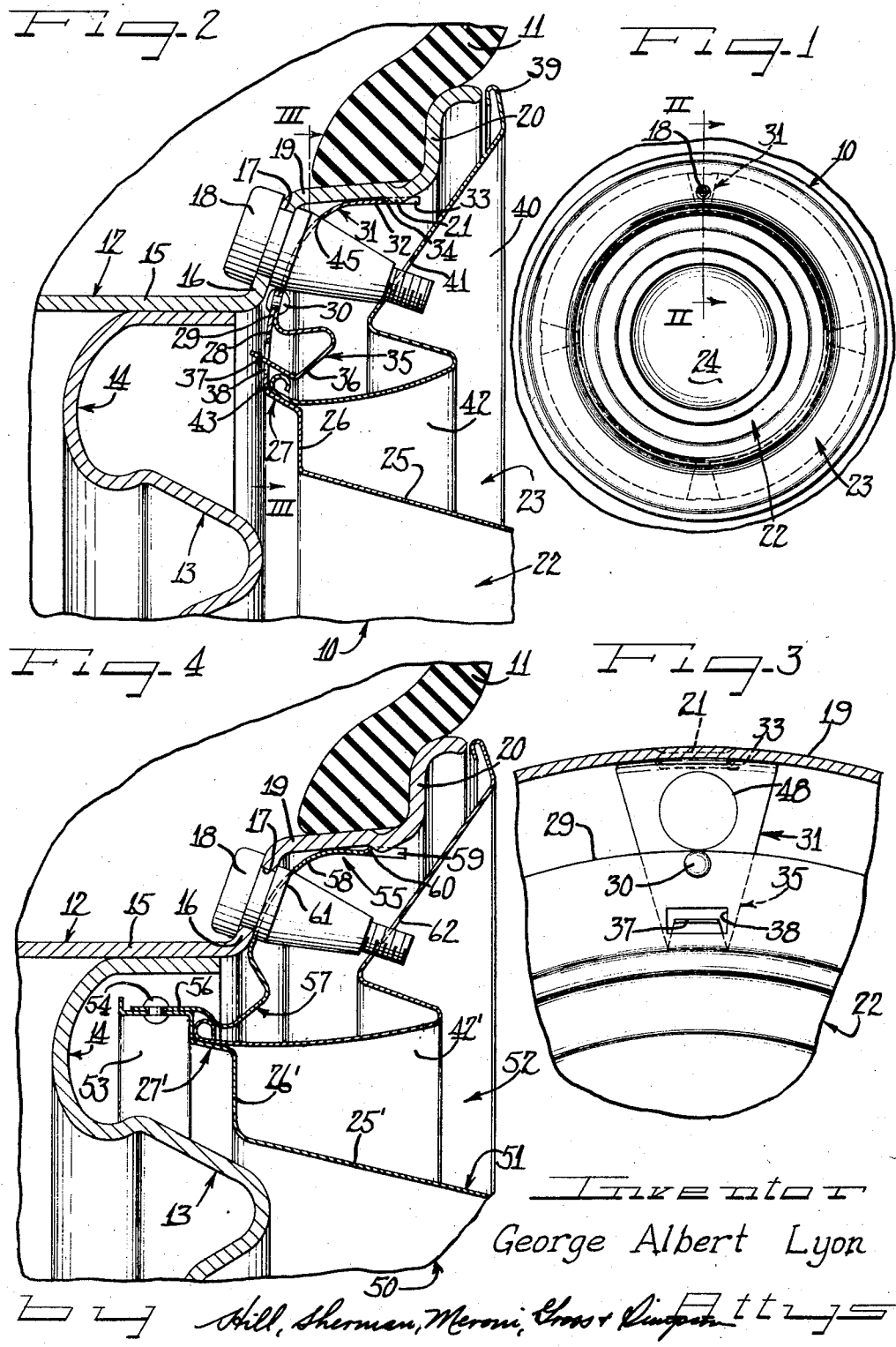

2,898,155

WHEEL COVER

George Albert Lyon, Detroit, Mich.

Application September 23, 1955, Serial No. 536,067

6 Claims. (Cl. 301—37)

This invention relates generally to an ornamental wheel cover construction and more particularly to a multi-part cover having novel means for retaining the cover parts in assembly upon the wheel.

In the automobile industry there is a never ending search for new type cover constructions having highly ornamental appearances. Still further, in this search for ornamental cover constructions there is also a great need for covers having improved retaining means capable of maintaining the cover parts in assembly while at the same time retaining the parts on an automobile wheel.

Accordingly, it is an object of this invention to provide a new multi-part cover construction possessing highly ornamental qualities.

Still another object of this invention is to provide a novel multi-part cover construction having novel means to maintain the cover parts in assembly together and on the wheel.

A further object of this invention is to provide a multi-part cover construction which lends itself to large scale production on an economical basis.

According to the general features of this invention there is provided in a wheel structure including rim and body parts with one of the parts having an axial flange provided with cover retaining shoulder means thereon, an inner cover member having a generally axial and then radial extending portion defining a seat adjacent its outer margin, clip means provided generally at the outer margin of the inner cover member having shoulder means opposite the seat and including a resilient radially outer portion capable of snap-on engagement behind the cover retaining shoulder means, and an outer cover member for overlying disposition over the clip means to conceal same and having an inner margin capable of snap-on pry-off engagement behind said shoulder means in nested bottomed relation in the seat on the inner cover member.

Another feature of the invention relates to the provision of novel clips on the cover which clips have means for retaining the inner cover member on the wheel and additional means for retaining the outer cover member on the inner cover member.

Still another feature of this invention resides in the manner in which the valve stem cooperates with the clip in order to insure co-rotation of the cover members on the wheel.

Yet another feature of this invention relates to the inner cover member having a relatively elongated radial portion merging at its inner end with the seat, the outer cover member including a relatively elongated radial portion terminating in the inner margin, and the inner and outer cover portions being spaced radially and defining together a relatively deep axial ornamental annular draw.

Other objects, features and advantages of the present invention will be readily apparent from the following detailed description of certain preferred embodiments thereof taken in conjunction with the accompanying drawing in which:

Figure 1 is a side elevational view of a wheel structure embodying features of the present invention;

Figure 2 is an enlarged fragmentary sectional view taken substantially on the line II—II of Figure 1 looking in the direction indicated by the arrow;

Figure 3 is an enlarged fragmentary sectional view taken substantially on the line III—III of Figure 2 looking in the direction indicated by the arrow; and Figure 4 is an enlarged fragmentary sectional view of a modified form of my invention.

As shown on the drawings:

My novel wheel cover 10 is cooperable with a more or less conventional type of automobile wheel which includes the usual tire 11 of either the tube or tubeless type carried in the customary way upon a multi-flanged drop center type of tire rim 12. This rim 12 is in turn supported in the usual way upon a central dished metallic body part 13 having a central bolt-on flange (not shown) by means of which the wheel can be attached by bolts or cap screws (not shown) to a part on an axle of a wheel. It will be noted that adjacent the junction of the tire rim and body part there is provided an annular relatively deeply axially inwardly extending recess 14 in the body part. This recess is especially adapted to receive therein portions of the cover as will be apparent from the drawings and from the discussion herein.

The tire rim 12 includes an attachment flange 15, a generally radial flange 16 having an aperture 17 for receiving therethrough a valve stem 18. Connected to the radial flange 16 is a generally radially and axially outwardly inclined flange 19 which terminates in a curled terminal flange 20. Provided on the axial flange 19 at circumferentially spaced intervals are a plurality of protuberances or bumps 21. These bumps are pressed radially inwardly from the flange 19.

The cover 10 includes inner and outer cover members 22 and 23. Inner cover member 22 has a relatively large crown 24 (Figure 1), which crown is joined at its outer periphery to a generally radially inwardly extending portion 25 which in turn merges with a generally radially outwardly extending portion 26 then leading into an annular seat indicated generally by the reference numeral 27. Seat 27 is defined by a stepped or generally axial and then radial extending portion 28. Joined to the outer margin 29 of the inner cover member 22 by means of a rivet 30 is my novel retaining clip 31. Clip 31 includes a resilient bowed generally radially outwardly and then axially outwardly extending portion 32 terminating in a notched extremity 33. Contained within the confines of the notch 33 is a radially outwardly turned gripping edge 34 which is adapted to bite behind the protuberance or shoulder 21.

Provided on the radially inner end of clip 31 is my novel retaining shoulder means or gooseneck-like terminal indicated generally at 35. Terminal 35 includes a lead-in generally radially and axially inwardly extending camming surface or shoulder 36 and terminates in a generally radially outwardly axially inwardly inclined shouldered extremity 37. This terminal 35 it will be noted, is positioned directly opposite the seat 27 for a purpose that will hereinafter become apparent. Additionally, the terminal extremity 37 when stressed is adapted to extend through aperture 38 in portion 28 thereby interlocking the clip with the inner cover member to insure relative co-movement of same.

Annular outer cover member 23 is adapted to completely overlie the tire rim in order to conceal same and has an outer marginal pry-off bead 39. Connected to the bead 39 is a dished portion 40 having an aperture 41 therein to receive the end of the valve stem 18. Dished portion 40 is connected to a generally radially and axially inwardly extending portion 42 which terminates in a curled cushioning annular bead 43.

In the assembly of the cover on the wheel it will be appreciated that the inner and outer cover members may be assembled together either before or after assembly on the wheel.

One of the ways to mount the cover on the wheel is by initially centering inner cover member 22 with respect to the wheel and more particularly the axial rim flange 19 and thereafter aligning aperture 45 in clip 31 with valve stem 18 and then pressing the cover into bottomed engagement with the wheel. It will be noted that in so doing rivet 30 engages against rim flange 16 and that clip portion 32 is bowed and stressed with the notched extremity 33 engaged behind the protuberances 21 to retain the inner cover member upon the wheel. Additionally, it will be noted that the generally axially spaced edges defining the notch engage on the sides of the protuberances to insure co-rotation of the wheel and cover.

Thereafter, the outer cover member is aligned with respect to the tire rim 10 and more particularly the aperture 41 is aligned with the valve stem 18 whereupon the cover is pressed into retained engagement with clips 31 and more particularly gooseneck-like terminals 35. As the outer cover member is pressed home, bead 43 initially engages along lead-in camming surface 36 which is progressively flexed upon pressure until the bead snaps behind shoulder 38 and bottoms in seat 27. It will be noted that the spring action of the gooseneck-like terminal 35 is stiffened as a result of locating the rivet connection between the clip and inner cover member 22 immediately adjacent to the gooseneck-like portion 35. Thus, the gooseneck-like portion 35 flexes from the rivet while at the same time the outer clip portion 31 flexes from a different direction from the same rivet when in assembly upon the wheel.

Removal of the cover members may be effected by first prying off the outer cover member by inserting a suitable pry-off tool under edge or bead 39 and prying same out of engagement with the inner cover member. Thereafter a suitable pry-off tool may be inserted under the margin 29 of cover member 22 and upon a prying action the cover may be ejected out of engagement with the wheel.

Figure 4 illustrates a modified form of my invention and where corresponding elements again appear as in the first modification the same numerals have been again used. Cover 50 includes inner and outer cover members 51 and 52.

In this form of the invention the inner cover member is adapted to extend deeply into the draw 14. The inner cover member 51 includes a seat 27' which is connected to a generally axially inwardly and then radially outwardly terminal attachment flange 53. Attached to this attachment flange 53 by means of rivet 54 is my novel clip 55. Clip 55 includes an attachment flange 56 which merges with shoulder means 57 opposite seat 27' and includes a resilient radially and axially outwardly extending portion 58 terminating in a notched extremity 59. Notched extremity 59 has a generally radially outwardly extending gripping edge 60 which functions in the same manner as in the first form of my invention.

It will be noted that when the inner cover member is assembled on the wheel the clip 55 bottoms against axial flange 16 and that the clip has an aperture 61 therein for receiving therethrough valve stem 18 to insure co-rotation of the cover member 51 and the wheel. Additionally, outer cover member 52 has an aperture 62 for receiving the terminal of the valve stem 18 insuring co-rotation of the wheel and outer cover member.

Assembly and removal of cover 50 may be effected in much the same manner as in the first form of my invention.

In both forms of the invention the ring and cover members when overlapped have their respective radially innermost annular ring edge area and radially outermost annular cover edge area in axially generally concentric relation to conceal the retaining structure and the wheel as well as conserve the amount of material used in the ring and cover members. In this respect it will be appreciated that the material is conserved by maintaining the blank sizes at a minimum and this may be accomplished by disposing the edge areas on the circular cover member and the ring member in generally concentric relation to preclude any costly overlap. The particular construction of the clips 31 and 55 are particularly adapted to help attain these ends.

It will be understood that modifications and variations may be effected without departing from the scope of the novel concepts of the present invention.

I claim as my invention:

1. In a wheel structure including body and tire rim parts, a cover assembly for disposition over the body and tire rim parts including a radially inner cover member having a radially outer portion of a diameter to extend adjacent to the rim part, a circumferentially spaced series of separate clips permanently attached to said radially outer portion, said clips having generally radially outwardly projecting portions extending beyond the edge of said radially outer portion of the inner cover member and retainingly engageable in press-on, pry-off relation with the rim part, and a radially outer cover member of ring form of a diameter to overlie the rim part and having an inner marginal portion for overlying said radially outer portion of the inner cover member, said clips having radially inner resilient shoulders overlying said radially outer portion of the inner cover member, said radially outer cover member having on its inner margin shoulder structure engageable in press-on, pry-off relation with said clip shoulders, said radially outer portion of the inner cover member defining a seat for said radially inner margin of the outer cover member against which said inner margin is thrust by said resilient shoulders of the clips.

2. In a wheel structure including body and tire rim parts, a cover assembly for disposition over the body and tire rim parts including a radially inner cover member having a radially outer portion of a diameter to extend adjacent to the rim part, a circumferentially spaced series of separate clips permanently attached to said radially outer portion, said clips having generally radially outwardly projecting portions extending beyond the edge of said radially outer portion of the inner cover member and retainingly engageable in press-on, pry-off relation with the rim part, and a radially outer cover member of ring form of a diameter to overlie the rim part and having an inner marginal portion for overlying said radially outer portion of the inner cover member, said clips having radially inner resilient shoulders overlying said radially outer portion of the inner cover member, said radially outer cover member having on its inner margin shoulder structure engageable in press-on, pry-off relation with said clip shoulders, said radially outer portion of the inner cover member defining a seat for said radially inner margin of the outer cover member against which said inner margin is thrust by said resilient shoulders of the clips, said radially outer portions of the clips being of substantial width and turned generally axially outwardly and engaging in face-to-face relation against a radially inwardly facing flange of the rim part and provided with a retaining shoulder engaging a shoulder on the rim part.

3. In a wheel structure including body and tire rim parts, a cover assembly for disposition over the body and tire rim parts including a radially inner cover member having a radially outer portion of a diameter to extend adjacent to the rim part, a circumferentially spaced series of separate clips permanently attached to said radially outer portion, said clips having generally radially outwardly projecting portions extending beyond the edge of said radially outer portion of the inner cover member and retainingly engageable in press-on, pry-off relation with the rim part, and a radially outer cover member of ring form of a diameter to overlie the rim part and having an inner marginal portion for overlying said radially outer portion of the inner cover member, said clips having radially inner resilient shoulders overlying said radially outer portion of the inner cover member, said radially outer cover member having on its inner margin shoulder structure engageable in press-on, pry-off relation with said clip shoulders, said radially outer portion of the inner cover member defining a seat for said radially inner margin of the outer cover member against which said inner margin is thrust by said resilient shoulders of the clips, said rim part having a valve stem projecting therefrom and one of said clips having intermediately therein a valve stem receiving hole through which the valve stem projects and with the edge defining said hole engaging about the base portion of the valve stem.

4. In a wheel structure including body and tire rim parts, a cover assembly for disposition over the body and tire rim parts including a radially inner cover member having a radially outer portion of a diameter to extend adjacent to the rim part, a circumferentially spaced series of separate clips permanently attached to said radially outer portion, said clips having generally radially outwardly projecting portions extending beyond the edge of said radially outer portion of the inner cover member and retainingly engageable in press-on, pry-off relation with the rim part, and a radially outer cover member of ring form of a diameter to overlie the rim part and having an inner marginal portion for overlying said radially outer portion of the inner cover member, said clips having radially inner resilient shoulders overlying said radially outer portion of the inner cover member, said radially outer cover member having on its inner margin shoulder structure engageable in press-on, pry-off relation with said clip shoulders, said radially outer portion of the inner cover member defining a seat for said radially inner margin of the outer cover member against which said inner margin is thrust by said resilient shoulders of the clips, attachment of the clips to the radially outer portion of the inner cover member being by means of respective rivets and the radially inner portions of the clips having means thereon interengaging with the radially outer portion of the inner cover member to hold the clips against turning relative to the radially inner cover member.

5. In a wheel structure including body and tire rim parts, a cover assembly for disposition over the body and tire rim parts including a radially inner cover member having a radially outer portion of a diameter to extend adjacent to the rim part, a circumferentially spaced series of separate clips permanently attached to said radially outer portion, said clips having generally radially outwardly projecting portions extending beyond the edge of said radially outer portion of the inner cover member and retainingly engageable in press-on, pry-off relation with the rim part, and a radially outer cover member of ring form of a diameter to overlie the rim part and having an inner marginal portion for overlying said radially outer portion of the inner cover member, said clips having radially inner resilient shoulders overlying said radially outer portion of the inner cover member, said radially outer cover member having on its inner margin shoulder structure engageable in press-on, pry-off relation with said clip shoulders, said radially outer portion of the inner cover member defining a seat for said radially inner margin of the outer cover member against which said inner margin is thrust by said resilient shoulders of the clips, said radially outer portion of the inner cover member facing axially outwardly and attachment of the clips being against the axially outer face of said radially outer portion of the inner cover member.

6. In a wheel structure including body and tire rim parts, a cover assembly for disposition over the body and tire rim parts including a radially inner cover member having a radially outer portion of a diameter to extend adjacent to the rim part, a circumferentially spaced series of separate clips permanently attached to said radially outer portion, said clips having generally radially outwardly projecting portions extending beyond the edge of said radially outer portion of the inner cover member and retainingly engageable in press-on, pry-off relation with the rim part, and a radially outer cover member of ring form of a diameter to overlie the rim part and having an inner marginal portion for overlying said radially outer portion of the inner cover member, said clips having radially inner resilient shoulders overlying said radially outer portion of the inner cover member, said radially outer cover member having on its inner margin shoulder structure engageable in press-on, pry-off relation with said clip shoulders, said radially outer portion of the inner cover member defining a seat for said radially inner margin of the outer cover member against which said inner margin is thrust by said resilient shoulders of the clips, said radially outer portion of the inner cover member having a generally axially inwardly extending margin radially outwardly relative to said seat and the clips having axially inwardly extending radially inner terminal portions lappingly engaging said axially extending margin and attachment of the clips being effected between said axially extending margin and terminal portions.

References Cited in the file of this patent

UNITED STATES PATENTS

| | | |
|---|---|---|
| 2,579,506 | Lyon | Dec. 25, 1951 |
| 2,600,412 | Lyon | June 17, 1952 |
| 2,609,245 | Lyon | Sept. 2, 1952 |
| 2,624,640 | Lyon | Jan. 6, 1953 |
| 2,629,635 | Lyon | Feb. 24, 1953 |
| 2,669,487 | Horn | Feb. 16, 1954 |